United States Patent [19]

Bullen

[11] Patent Number: 5,681,033

[45] Date of Patent: Oct. 28, 1997

[54] WORKPIECE PICK-UP JIG AND POSITIONING TOOL

[75] Inventor: George Nicholas Bullen, Oxnard, Calif.

[73] Assignee: Northrop Grumman Corporation, Los Angeles, Calif.

[21] Appl. No.: 595,152

[22] Filed: Feb. 1, 1996

[51] Int. Cl.$^6$ .................................................. B25B 1/22
[52] U.S. Cl. .......................... 269/71; 269/296; 269/909; 269/289 R
[58] Field of Search .............................. 269/50, 54, 71, 269/72, 73, 74, 80, 268, 297, 296, 900, 901, 904, 909; 248/130

[56] References Cited

U.S. PATENT DOCUMENTS

| | | | |
|---|---|---|---|
| 1,236,246 | 8/1917 | Amelung | 269/296 |
| 1,389,068 | 8/1921 | Olson | 269/296 |
| 2,589,489 | 3/1952 | Fuhr | 51/217 |
| 2,805,782 | 9/1957 | Jester | 214/1 |
| 2,963,946 | 12/1960 | Muench | 90/59 |
| 3,030,988 | 4/1962 | Patterson et al. | 144/288 |
| 3,060,917 | 10/1962 | Dickey | 125/35 |
| 3,085,798 | 4/1963 | Gavette | 269/17 |
| 3,458,056 | 7/1969 | Stefan et al. | 214/1 |
| 3,830,488 | 8/1974 | Wilger et al. | 269/909 |
| 3,977,662 | 8/1976 | Cook | 269/71 |
| 4,095,778 | 6/1978 | Wing | 269/71 |
| 4,200,273 | 4/1980 | Das Gupta et al. | 269/61 |
| 4,221,368 | 9/1980 | Channel | 269/71 |
| 4,531,720 | 7/1985 | Soder | 269/71 |
| 4,588,346 | 5/1986 | Smith | 414/673 |
| 4,723,769 | 2/1988 | Nilsson | 269/58 |
| 4,767,109 | 8/1988 | Raketich | 269/61 |
| 4,796,029 | 1/1989 | Duppong et al. | 342/13 |
| 5,019,129 | 5/1991 | Johanson | 269/71 |
| 5,065,989 | 11/1991 | Ho | 269/901 |
| 5,396,791 | 3/1995 | Mollmann et al. | 269/909 |
| 5,592,981 | 1/1997 | Derecktor | 269/901 |
| 5,593,147 | 1/1997 | Read | 269/901 |

Primary Examiner—Timothy V. Eley
Assistant Examiner—Lee Wilson
Attorney, Agent, or Firm—Terry J. Anderson; Karl J. Hoch, Jr.

[57] ABSTRACT

A workpiece pick-up and positioning tool or apparatus and, more particularly, a jig and fixture arrangement facilitating the controlled movement and positioning of a workpiece in order to enable the specific treatment thereof. The workpiece, particularly, such as an aircraft inlet duct, is moved to a pick-up jig inlet tool arrangement from an assembly jig whereby the inlet duct is then inserted into and supported by a cradle. The cradle, in turn, is supported above the floor by at least two workstands whereby one of the workstands is equipped with a swivel attaching and joining the workstands to the cradle. A specific linear motion device is then adapted to tilt the cradle upwardly and into a vertical position, thereby concurrently pivoting the duct supported therein into a similar position, whereupon latching mechanisms locks the cradle into the vertical position through the intermediary of a suitable cable which is coordinated with the movement of the cradle.

9 Claims, 2 Drawing Sheets

WORKPIECE PICK-UP JIG AND POSITIONING TOOL

BACKGROUND OF THE INVENTION

1. Field of the Invention

The present invention relates to a workpiece pick-up and positioning tool or apparatus and, more particularly, pertains to a jig and fixture arrangement facilitating the controlled movement and positioning of a workpiece in order to enable the specific treatment thereof.

Pursuant to the more specific aspect of the invention, the apparatus pertains to a workpiece jig and positioning tool or apparatus which facilitates the implementation of an improved capability in the simplification of treating, such as drilling, riveting, welding and assembling workpieces; especially such as but not limited to large-sized inlet ducts utilized in aircraft; or possibly large air-conditioning ducts for commercial applications, and the like.

For example, it is currently the practice in the aircraft industry in order to implement the drilling, riveting, welding and assembling of aircraft ducting; for instance, such as aircraft inlet ducts, which are generally bulky or large in size and heavy in weight so as to render these workpieces difficult to manipulate, to move a respective inlet duct from an assembly jig to a pick-up jig, whereby the latter is a holding device ordinarily made of wood, and which retains the inlet duct in a horizontal position. In this instance, while the inlet duct is located in this position by the pick-up jig, an operator who intends to perform work on the inlet duct is normally seated on a chair and reclines backwardly while drilling up and from underneath the inlet duct. Concurrently or in conjunction with this operation, a further operator climbs up on and then moves off a workstand so as to lie down within the generally horizontally oriented duct in order to implement a similar sequence of operations within the inlet duct. The personnel or operators which are assigned to perform these specific work tasks in these physical positions each workday until the inlet duct operation is complete, in essence, the drilling, riveting, welding and assembling thereof. The foregoing mode of operation renders the entire procedure rather difficult in the manipulating of the various work tools in order to be able to, respectively, drill, rivet and assemble the inlet duct while necessitating the operators to assume rather uncomfortable physical positions over extensive periods of time. This rather difficult to carry out sequence of operations may necessitate extensive "downtime" in order to afford the uncomfortably positioned operators some periods of rest, and may also be a cause of potential hazards and accidents to which the operators are exposed, while possibly adversely affecting the quality of the work product.

2. Discussion of the Prior Art

Although numerous devices are currently known in various technologies and widely employed in industry for moving and positioning workpieces; for instance, such as workpiece supporting devices, jigs and fixtures, none of these devices are specifically designed to enable simplification of the typical movement and linear positioning of a workpiece, such as a large-sized aircraft ducting section, in order to facilitate and render easier the working operations which are to be implemented thereon.

Raketich U.S. Pat. No. 4,767,109 discloses a workpiece positioning apparatus including a turntable and a linear drive for tilting the turntable from a horizontal into a vertical positioning. Although this provides for a workpiece moving and positioning apparatus, the construction and operative components thereof are extremely complex and expensive in nature.

Nilsson U.S. Pat. No. 4,723,769 discloses a welding bench including a tiltable and raisable upper base plate structure. This provides for only relatively limited movement and does not incorporate workpiece jig pick-up and assembling devices pursuant to the present invention.

Smith U.S. Pat. No. 4,588,346 discloses a positioning and retaining apparatus for maintaining an object in a substantially weightless condition including a vertical displacement unit and a rotatable arm structure affording six degrees of freedom. There is no disclosure of a jig and workpiece positioning tool or apparatus analogous to that provided herein.

Das Gupta et al. U.S. Pat. No. 4,200,273 discloses a gas turbine maintaining and support stand which enables rotation of the gas turbine about its longitudinal axis and about a further axis extending transversely thereof.

Gavette U.S. Pat. No. 3,085,798 discloses a power plant stand facilitating the pivotal and rotational movement of a gas turbine or jet engine while positioned or mounted on a test stand.

Other devices for imparting selective or composite rotational, linear and tilting movements to various types of workpieces and structures are disclosed in, respectively, Johanson U.S. Pat. No. 5,019,129; Duppong et al. U.S. Pat. No. 4,796,029; Stefan et al. U.S. Pat. No. 3,458,056; Dickey U.S. Pat. No. 3,060,917; Patterson et al. U.S. Pat. No. 3,030,988; Muench U.S. Pat. No. 2,963,946; Jester U.S. Pat. No. 2,805,782 and Fuhr U.S. Pat. No. 2,589,489.

Although all of the foregoing patents describe different types of apparatus and installation including jigs and fixtures for manipulating workpieces and positioning these in predetermined orientations, none of these disclose the particular type of workpiece jig and positioning tool or apparatus of simple construction while possessing the inventive capabilities; particularly such as the orientation positioning of a large workpiece such as aircraft inlet ducting to enable the processing thereof; for example, drilling, riveting, welding, assembling and the like, in a manner as described herein.

SUMMARY OF THE INVENTION

In accordance with the inventive concept, in order to alleviate the limitations and potential drawbacks encountered in prior art workpiece positioning apparatuses, such as workpiece pick-up jigs and positioning tools for moving a large tubular workpiece, such as an aircraft inlet duct from one position or orientation to another to thereby facilitate specific drilling, riveting and assembling steps, the present invention contemplates a workpiece positioning apparatus in which the workpiece, particularly, such as an aircraft inlet duct, is moved to a pick-up jig inlet tool arrangement from an assembly jig whereby the inlet duct is then inserted into and supported by a cradle. The cradle, in turn, is supported above the floor by at least two workstands whereby one of the workstands is equipped with a swivel attaching and joining the workstands to the cradle. A specific linear motion device is then adapted to tilt the cradle upwardly and into a vertical position, thereby concurrently pivoting the duct supported therein into a similar position, whereupon latching mechanisms locks the cradle into the vertical position through the intermediary of a suitable cable which is coordinated with the movement of the cradle. Concurrently, the cradle locking devices are brought into a position through additional cable structure which is coordinated with the movement of the cradle, and once the cradle is in the vertical position, and simultaneously therewith the inlet duct, the latter can be selectively displaced upwardly and downwardly through the facility of an internally mounted linear motion device. This device enables the positioning of the ducting at various elevations enabling a single operator to implement the various work tasks or procedures, such as drilling, riveting and assembling required to be imparted to the inlet duct in conformance with designated work requirements.

Accordingly, it is an object of the present invention to provide a workpiece positioning apparatus which is adapted to enable a workpiece to be moved among a plurality of various positions to facilitate the treatment or processing thereof.

A further object of the present invention resides in the provision of a workpiece positioning apparatus of the type described whereby the workpiece may be readily and automatically tilted from a substantially horizontal position into a vertical position and whereby vertical displacement thereof into predetermined positions is facilitated to enable an operator to readily implement various operations on the workpiece.

Still another object of the present invention is to provide a workpiece pick-up jig and positioning fixture or apparatus for implementing the orientation of a workpiece, such as large-sized aircraft inlet ducting or the like, into various positional alignments to thereby facilitate the implementation of operations thereon by an operator in a simple and convenient manner.

BRIEF DESCRIPTION OF THE DRAWINGS

Reference may now be had to the following detailed description of a preferred embodiment of the invention, taken in conjunction with the accompanying drawings illustrating a workpiece pick-up jig and positioning apparatus; in which.

DETAILED DESCRIPTION OF A PREFERRED EMBODIMENT

Figure 1:
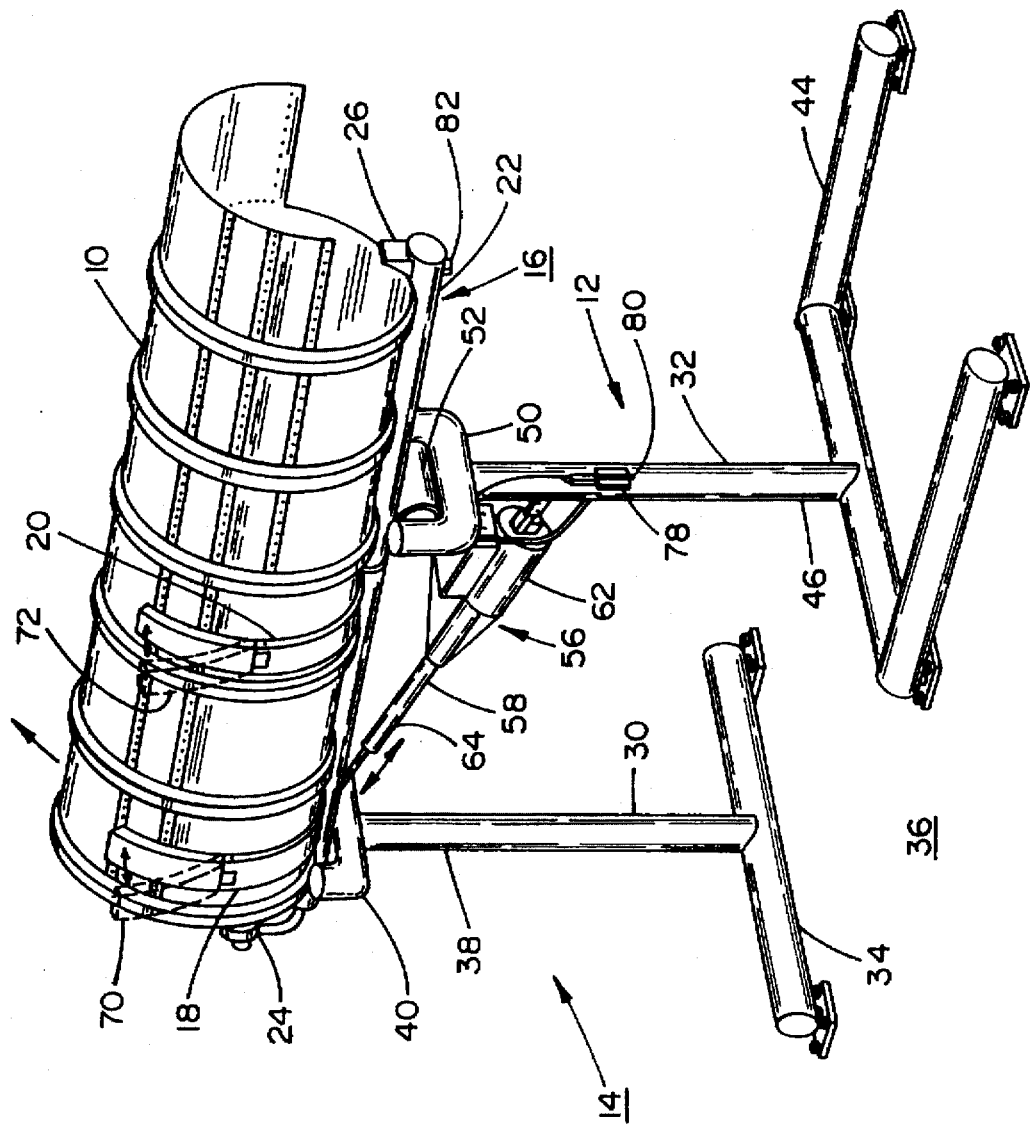
FIG. 1 illustrates a perspective view of the inventive apparatus mounting a workpiece in the form of aircraft inlet duct, shown in a first operative position thereof.

Referring now in more specific detail to FIG. 1 of the drawings, a large-sized workpiece 10 which, in this instance, comprises an aircraft inlet duct of generally cylindrical configuration, is moved to a pick-up jig inlet apparatus 12 from an assembly jig 14. Hereby, the duct 10 is supported in a cradle structure 16 consisting of a pair of generally curvilinear elements 18, 20 encompassing a portion of the periphery of the duct 10, and whereby the elements 18, 20 are attached to a horizontal bar 22 extending substantially the length of the duct, and which incorporates end stops 24, 26 at opposite ends thereof which prevent the axial displacement of the duct 10 relative to the cradle structure 16 when supported therein.

The cradle structure 16 is supported on a pair of workstands 30, 32, of which a first workstand 30 has a horizontal bar 34 mounted on a support surface, such as a floor 36 in a fixed position and which also includes an upright 38 and a generally bifurcated element 40 at the upper end of upright 38 straddling the horizontal support bar 22 for the duct 10.

The second workstand 32 is axially spaced along the length of the duct 10 from the first workstand 30 and includes a generally U-shaped horizontal base structure 44 fixed to the floor 36, including a central upright 46 projecting vertically from the center bar 48 of the U-shaped base structure 44, and which extends upwardly into a pivotable cradle support 50 of bifurcated configuration, and which incorporates a roller 52 journaled therein for longitudinal displacement of the bar 22 relative thereto.

Connected to the upright 46 of the second workstand 32 is a linear motion device 56 having a telescopable arm member 58, which has the one arm end 60 thereof articulated to the upright 46. An actuating motor 62 is attached to the device 56 for selectively extending or retracting a telescopable arm portion 64 of the device 56, and with the distal end of telescopable arm portion 64 engaging the horizontal support bar 22 of the cradle structure 16.

As is shown by the phantom lines in FIG. 1, curvilinear or rib-shaped cradle yoke portions 70, 72 may be opened outwardly to permit the workpiece or ducting 10 to be inserted therein in the open position thereof, and then clamped closed to provide in the locking position of the apparatus 12.

Figure 3:
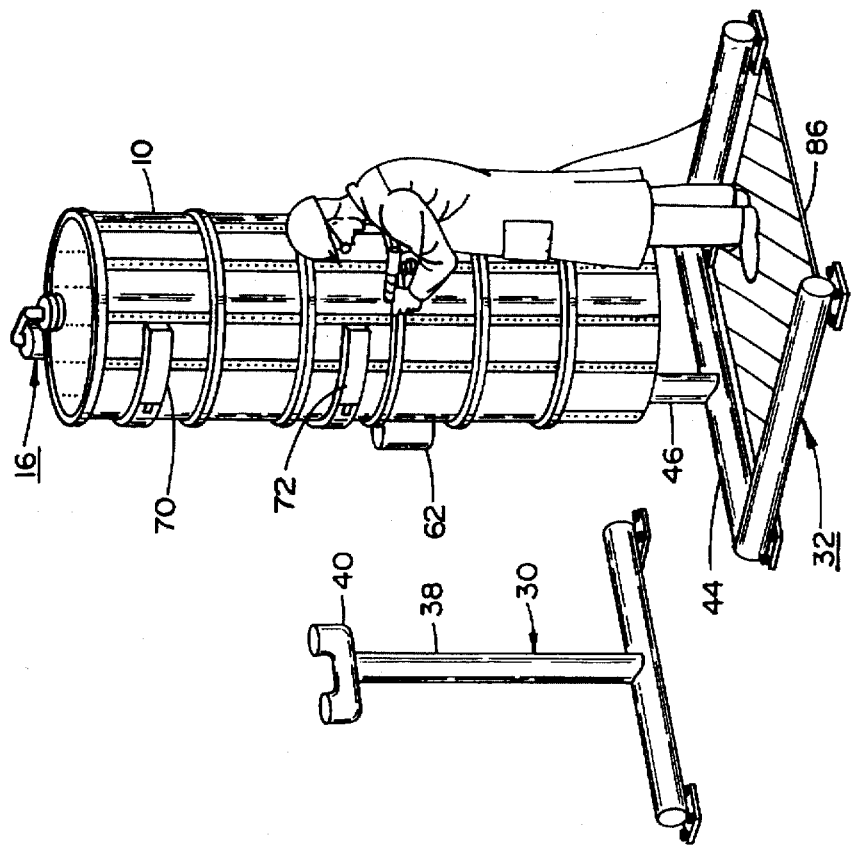
FIG. 3 illustrates a view similar to FIG. 2 showing the workpiece in the process of being worked on by an operator.
Figure 2:
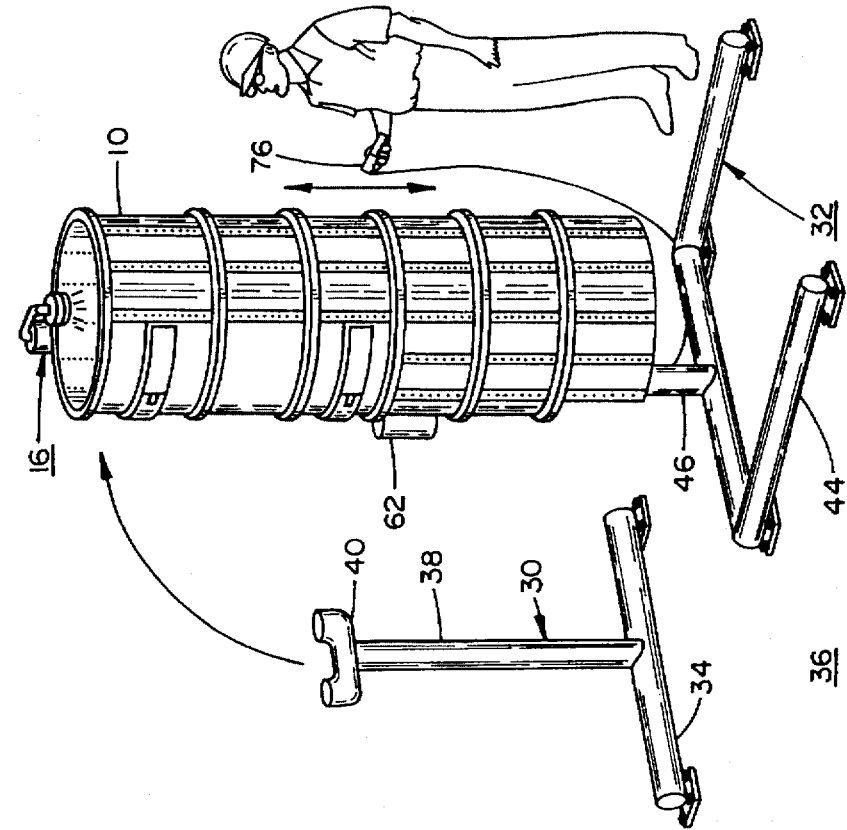
FIG. 2 illustrates the apparatus of FIG. 1 as having oriented the workpiece in a second operative position thereof.

As indicated in FIG. 2 of the drawings, upon a suitable controller 76 being manually actuated by an operator, the cradle structure 16 supporting the workpiece 10 is swung into an upright position by being pivoted about the bifurcated tiltable cradle support 50 and roller 52 at the upper end of the second workstand upright 46 by extending telescopable arm portion 64, so as to orient the inlet duct or workpiece 10 into an upright position enabling an operator to carry out work thereon, such as riveting, drilling, assembling various components and the like, as shown in FIG. 3. A latching arrangement 78 which is mounted on the upright 46 may comprise a vertically displaceable locking pin 80 which is responsive to actuation of the controller 76 so as to engage into an eyelet 82 fastened to the proximate end of support bar 22. This will prevent the cradle structure from being pivoted into its horizontal orientation until the locking pin 80 is retracted from the eyelet 82 thereby releasing the cradle structure 16 so as to be pivotable about roller 52 upon retraction of telescopable arm member 58.

Additionally, in order to further facilitate the work of the operator, another internally located linear motion device (not shown) may displace the cradle structure 16 including the internal duct attached along a vertical orientation to various height, as shown by arrow A in FIG. 2. This also can be implemented by means of the controller 76 being manipulated by the operator.

Thereafter, as illustrated in FIG. 3 of the drawings, suitable work tasks or operations can be implemented on the workpiece 10 while at a predetermined vertical raised position relative the upright 46 of the second workstand 32.

In order to avoid the workpiece 10 from being moved while being worked on by an operator, a suitable horizontal support platform in the type of a sensor plate 86 may be positioned above the floor 36 adjacent the second workstand 32 in the region defined by the base structure 44, on which plate there stands the operator, whereby a microswitch (not shown) can sense the movement or preference of an operator which will then inhibit any displacement of the workpiece 10.

Upon completion of the work tasks on the workpiece or duct 10, and upon an operator stepping off the sensor plate 86, suitable actuation of the apparatus may be undertaken by means of operation of the controller 76 so as to return the workpiece into its initial horizontal position as shown in FIG. 1, whereupon the completed workpiece may be removed subsequent to opening of the cradle yoke portions 70, 72, and then replaced by a further workpiece which is to be worked on.

From the foregoing, it becomes evident that there is provided an extremely simple and easily operated pick-up jig and workpiece inlet and positioning apparatus 12 which is practical and simple to use, inexpensive to manufacture and imparts a superior facility to the treatment or working of the workpiece by a single operator at an enhanced degree of comfort and safety to the latter.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A workpiece pick-up and positioning tool comprising a first and a second upright fixedly positioned in spaced relationship to each other; means for supporting a workpiece positioned on said tool at upper ends of each of said uprights in a substantially horizontal orientation; actuating means on said second upright for tilting said workpiece into a substantially vertical orientation about said second upright; said workpiece supporting means including cradle means, said cradle means comprising an elongate member so as to extend along a surface of a workpiece supported thereon; cradling elements fastened to said elongate member for releasably clamping said workpiece to said elongate member, said first and second uprights each including a bifurcated structure at the upper end thereof, said elongate member being supported on said bifurcated structure in the horizontal orientation of said workpiece resting on said first and second uprights, each said bifurcated support structure straddling the longitudinal axis of said elongate member; and roller means being mounted on the bifurcated structure of said second upright to facilitate axial movement of said elongate member relative to said second upright during tilting of said workpiece.

2. A workpiece pick-up and positioning tool as claimed in claim 1, wherein said actuating means for tilting said workpiece is a linear motion device comprising a telescopable arm having one end mounted on said second upright and an opposite end fastened to said elongate member, and motor means for selectively extending said telescopable arm to raise said workpiece away from said first upright and to tilt said workpiece into a vertical orientation about said second upright and retracting said telescopable arm to position said workpiece on said first and second uprights in a horizontal orientation.

3. A workpiece pick-up and positioning tool as claimed in claim 2, wherein said second upright mounts latching means for releasably locking said workpiece in the vertical orientation thereof.

4. A workpiece pick-up and positioning tool as claimed in claim 3, wherein said latching means comprises a locking pin slidably mounted on said second upright; and eyelet means on said elongate member being releasably engageable by said locking pin.

5. A workpiece pick-up and positioning tool as claimed in claim 1, wherein sensor means is adapted to determine the presence of a human operator present proximate said upright to prevent movement of said workpiece during operations being carried out on said workpiece.

6. A workpiece pick-up and positioning tool as claimed in claim 5, wherein said sensor means comprises a horizontal support platform for the operator located proximate a lower end of said second upright.

7. A workpiece pick-up and positioning tool as claimed in claim 1, wherein said workpiece comprises a duct, said elongate member extending axially along an outside surface of said duct; stop means on opposite ends of said elongate member to prevent axial displacement of said duct relative to said elongate member, said cradling elements including outwardly pivotable and inwardly closable curvilinear segments for selective releasing and clampingly locking said duct onto said elongate member.

8. A workpiece pick-up and positioning tool as claimed in claim 1, wherein said workpiece supporting means includes means for adjusting the elevation of said workpiece in the vertically oriented position of said workpiece.

9. A workpiece pick-up and positioning tool as claimed in claim 1, wherein a remotely-located controller is operable to effectuate operation of said actuating means.

* * * * *